Feb. 9, 1937.  T. B. STEPHENSON  2,070,030
STEAM BATH CABINET
Filed July 17, 1936  3 Sheets-Sheet 1
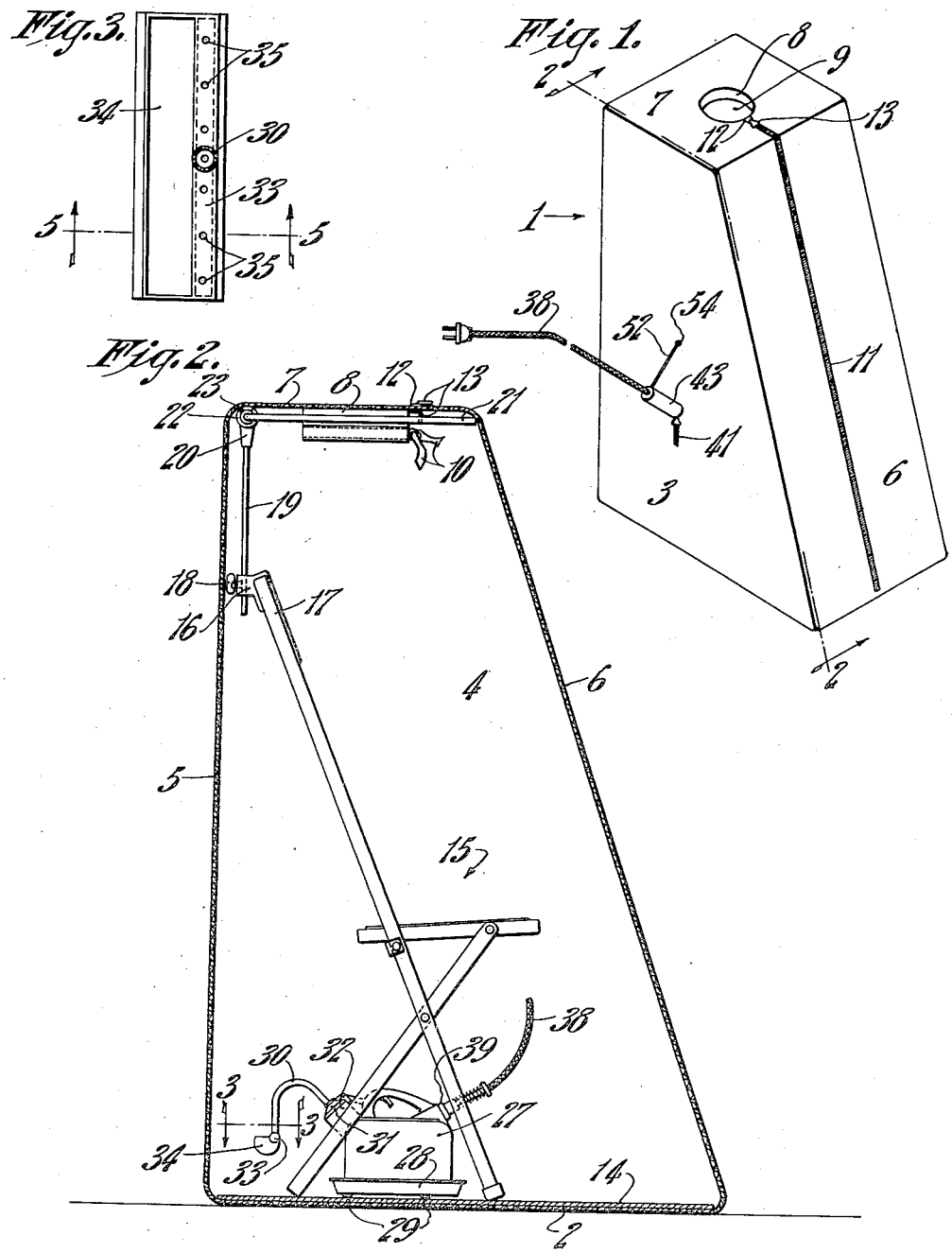
INVENTOR,
Thomas B. Stephenson,
BY
Harry W. Bowen.
ATTORNEY.

Feb. 9, 1937. T. B. STEPHENSON 2,070,030
STEAM BATH CABINET
Filed July 17, 1936  3 Sheets-Sheet 2
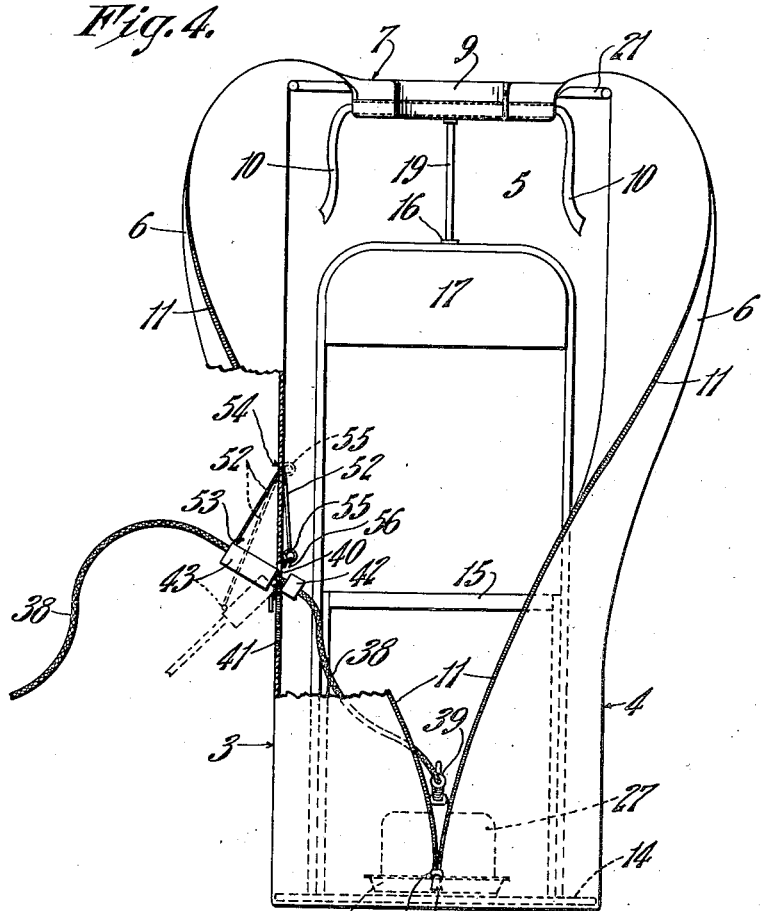
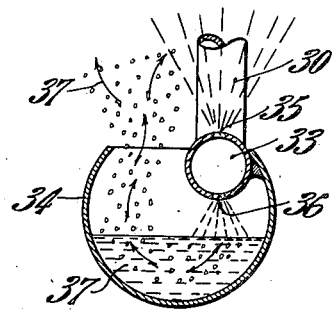
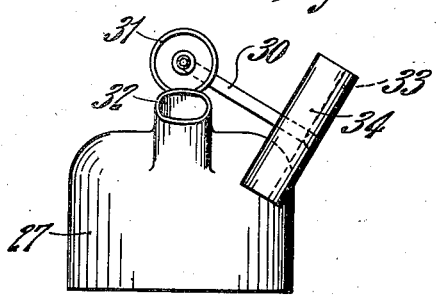
INVENTOR,
Thomas B. Stephenson,
BY
Harry W. Bowen.
ATTORNEY.

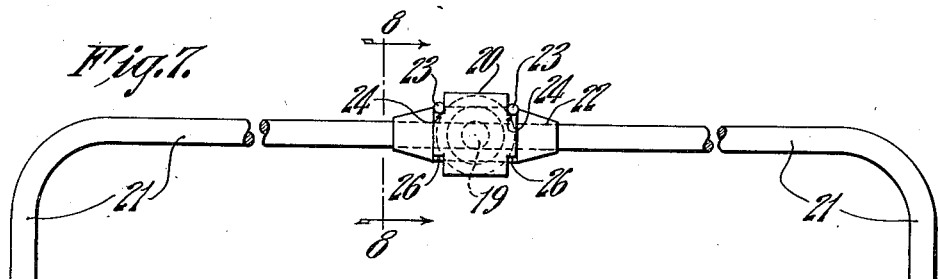
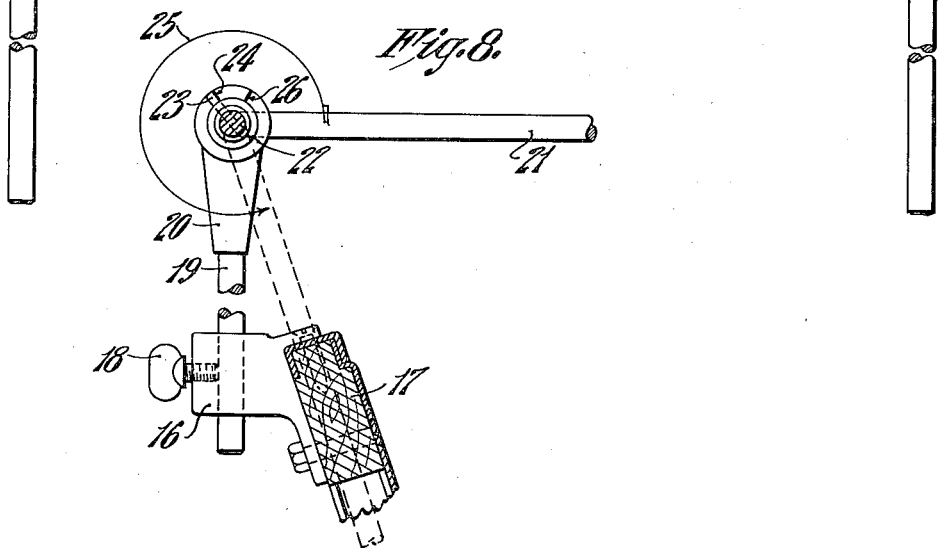
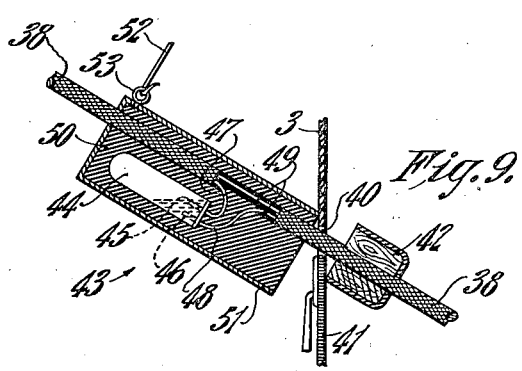

Patented Feb. 9, 1937

2,070,030

UNITED STATES PATENT OFFICE 2,070,030

STEAM BATH CABINET

Thomas B. Stephenson, Springfield, Mass., assignor of one-half to Arthur F. Stephenson, Springfield, Mass., and one-half to John G. Stephenson, New York, N. Y.

Application July 17, 1936, Serial No. 91,106

6 Claims. (Cl. 4—164)

This invention relates to improvements in steam bath cabinets.

An object of this invention is to provide a steam bath cabinet of extremely simple and economical construction, which may be assembled and used in any convenient location, and which may also be disassembled and packed in a small, convenient package for transportation, or storage.

A further object of this invention is to provide a steam cabinet which is completely controlled and operated by the user, thereby eliminating the necessity for the attendance or presence of any other person.

A still further object of this invention is to provide, in a steam bath cabinet, an enclosure of flexible material which may be packed in a small space and which may be easily removed for cleaning, washing, or other purposes and as easily replaced.

Another object of this invention is to provide, in cooperation with the steam supply of the steam bath cabinet, means for mixing uniformly with the steam an atomized perfume, or other desired substance.

These, and other objects and advantages of this invention, will be more completely disclosed and described in the following specification, the accompanying drawings, and the appended claims.

Broadly, this invention comprises, in combination, a mat, a support for a seated person on the mat, a flexible enclosure for the mat and support, means on the support for adjustably supporting and forming the upper portion of the enclosure, an electric steam generator within the enclosure, an electric cable connected thereto, a switch on the cable and located outside of the enclosure, means within the enclosure for operating the switch, a container for a medicament, or other liquid substance, and connecting means between the steam generator and the container, whereby a portion of the steam generated is directed into contact with the liquid in the container.

A preferred form of this invention is illustrated in the accompanying drawings, in which:—

Fig. 1 is a perspective external view of the steam bath cabinet.

Fig. 2 is a vertical sectional view, taken on the line 2—2 of Fig. 1.

Fig. 3 is an enlarged plan view of the container for liquid medicament on the line 3—3 of Fig. 2.

Fig. 4 is a front elevational view of the cabinet with the flexible enclosure opened to admit a person.

Fig. 5 is a cross sectional view of the liquid container, taken on the line 5—5 of Fig. 3.

Fig. 6 is a front elevational view of the steam generator, in position for filling.

Fig. 7 is a detail plan view of the supporting means for the upper portion of the flexible enclosure.

Fig. 8 is a sectional view, taken on the line 8—8 of Fig. 7, and

Fig. 9 is a detail sectional view of the controlling switch for the steam generator.

Referring now to the drawings in detail, in which like numerals refer to like parts throughout:—

An enclosure 1, preferably of flexible, washable material and having a base, or bottom portion 2, side wall portions 3 and 4, rear wall portion 5, front portion 6, and top portion 7, is slit from the central, front edge of the base portion 2 to the central, front portion of a collar, or neck band 8, bounding a head opening 9 in the top portion 7. The band 8 is provided with straps 10 for fastening and adjusting the band around the neck of a person within the enclosure 1. A slide fastener track 11 is secured on the edges of the slit in the front 6 and the traveler 12 is provided with an operating link 13 on both inside and outside, so that the slide traveler 12 may be operated to close the enclosure 1 from either inside or outside. A mat 14, preferably of waterproof, or moistureproof material, is placed on the button 2 of the enclosure 1, and a foldable chair 15 is placed on the mat 14. A bracket, or bearing member 16, fastened to the back 17 of the chair 15, adjustably supports, by means of a setscrew 18, a rod 19, on the upper end of which a bearing member 20 is supported. A rod 21, bent in the form of a wide U, is fixedly secured in a bushing sleeve 22, which is revolvably supported in the bearing 20, and the rod 21 is normally supported in a horizontal position, as indicated in Figs. 2, 4, 7, and 8, by means of the engagement of pins, or studs 23, in the bushing 22, against shoulders 24, formed on the bearing 20. In its horizontal position, the rod 21 provides a frame on which the top 7 of the enclosure 1 is supported. When the rod 21 is not in use, it may be swung around behind the back 17 of the chair 15, as indicated by the arrow 25 in Fig. 8. This movement is limited by co-operation of the studs 23 and shoulders 26 on the bearing 20.

A steam generator 27, of standard make, is supported in a plate 28 which is raised above the mat 14 by buttons 29 of heat resisting material. A tube 30, pivotally supported on a cover 31 on the tubular projection 32 of the generator 27, is connected to a barrel or drum 33 of a trough 34. Openings 35 and 36 are provided in the top and bottom of the drum 33, respectively. Steam from the generator 27 enters the drum 33 through the tube 30, and a portion of the steam is ejected through the openings 35, directly into the enclosure 1. A portion of the steam is also ejected through the openings 36 into contact with a medicated liquid 37 in the trough 34, and some of the medicated liquid is thus picked up by the steam and carried into the enclosure 1, as indicated in Fig. 5, by the arrows 37'. The pivotal connection of the tube 30 on the cover 31 of the tubular projection 32 permits the tube 30 and trough 34 to drop, by gravity, to one side, out of the way, when the cover 31 is raised for filling the steam generator 27, as indicated in Fig. 6.

An electric cable 38, provided with a standard plug 39 for removable connection with the generator 27, passes through an opening 40 in the side 3 of the fabric enclosure 1. The opening 40 is normally closed on the cable 38 by means of a slide fastener 41, but may be opened by operation of the slide fastener 41 to permit removal of the cable 38. The cable 38 is supported on the side wall 3, of the enclosure 1, between a collar 42 on the inside of the wall 3 and a switch 43 on the outside of the wall 3. The switch 43 comprises a mercuroid switch member 44, the terminals 45 and 46 of which are electrically connected to opposite ends 47 and 48 of one of the wires 49 of the cable 38, as indicated in Fig. 9. The switch 44 and wires 47, 48, and 49 are enclosed in insulating material 50, which is supported in a sleeve, or container 51. A cord, or chain 52, removably attached at one end to a ring 53 on the container 51, passes through an opening 54, in the wall 3 and has secured at its opposite end, within the enclosure 1, a ring 55. A pull on the ring 55 will raise the mercury switch 43 into a closed circuit position, as indicated in Figs. 1, 4, and 9, and the switch 43 may be held in this position by engagement of the ring 55 on a hook 56, secured on the inside of the wall 3. Release of the ring 55 will cause the mercury switch 43 to drop, by gravity, into an open circuit position, as indicated by dotted lines in Fig. 4. Thus, the switch 43 and steam generator 27 are operable and controllable by the occupant from within the enclosure 1.

The mat, chair and frame, steam generator and electric cable may be quickly and easily removed from the enclosure 1, and the whole may be folded and packed in a very small package. Also, the enclosure 1 may be removed, washed and replaced.

What I claim is:

1. In combination, in a steam bath cabinet, a flexible enclosure member for receiving a chair, or other support for the occupant, means for opening and closing the enclosure member, a container for receiving a medicated liquid, controllable means for heating the liquid, the heat controllable means being operable by the occupant when seated within the enclosure by means of a mercury switch located on the outside of the enclosure, a flexible member passing through an opening in the enclosure having one end connected to the mercury switch and its other or inner end located within the enclosure and detachable means for the inner end, whereby the occupant can operate the heat controllable means, as described.

2. In a steam bath cabinet, a flexible enclosure member, means for opening and closing the same, means for supplying heated and medicated moisture to the interior of the cabinet comprising a water-receiving receptacle located within the enclosure, means for heating the water in the receptacle, said receptacle having a tubular projection, a cover for the tubular projection, a drum having openings, a tube connected to the drum and for conveying steam to the drum, an open trough in which the drum having openings is located and in which a medicated liquid is placed, whereby some of the steam from the heated water will enter the enclosure and some will enter the drum and escape through the openings therein coming in contact with the medicated liquid therein and escaping therefrom to the interior of the enclosure.

3. A device for supplying medicated moisture comprising, a water-receiving receptacle, means for heating the same, a trough in which a medicated substance is placed, and having an open top, a tubular member in the trough having perforations in its upper and lower surfaces, means for conveying steam from the said receptacle to the tubular member from which it escapes and comes into contact with the medicated liquid in the trough and then escapes from the trough, and, at the same time, steam that is not medicated escapes from the tubular member.

4. In combination, in a steam bath cabinet, a flexible enclosure member having a neck opening, a mat on its bottom portion, and closure means extending from the neck opening to the mat, the closure means being operable on both the inner and outer surface, foldable rod means for supporting the upper end of the flexible enclosure, a support for the foldable rod, means for supplying moisture to the interior of the enclosure, and means for controlling the quantity of moisture by the occupant from the inside of the enclosure.

5. In combination, in a steam bath cabinet, a flexible enclosure member having a neck opening, a mat on its bottom portion, and closure means extending from the neck opening to the mat, the closure means being operable on both its inner and outer surface, foldable rod means for supporting the upper end of the flexible enclosure, a support for the foldable rod, means for supplying moisture to the interior of the enclosure and means for controlling the quantity of moisture by the occupant from the inside of the enclosure, said means comprising an electric switch having an operative means within the enclosure.

6. In a steam bath cabinet, an enclosure member, means for supplying moisture thereto comprising, an electrically heated liquid-receiving receptacle, a mercury switch located on the outside of the enclosure, connections therefrom to the said receptacle, means for suspending the switch in its circuit-closing position comprising, a flexible member connected to the switch and extending through the enclosure within reach of an occupant, whereby, when the suspending means is released by the occupant inside, the circuit will be opened, or, closed, as described.

THOMAS B. STEPHENSON.